United States Patent Office 3,388,096
Patented June 11, 1968

3,388,096
N-2-(4-HYDROXY-4-METHYLPENTYL)-N'-PHENYL-PARA-PHENYLENEDIAMINE
George E. P. Smith, Jr., Akron, Ohio, assignor to The Firestone Tire & Rubber Company, Akron, Ohio, a corporation of Ohio
No Drawing. Filed Sept. 21, 1964, Ser. No. 398,084
3 Claims. (Cl. 260—45.9)

ABSTRACT OF THE DISCLOSURE

The invention relates to N-2-(4-hydroxy-4-methylpentyl)-N'-phenyl-para-phenylenediamine. It is an antiozonant, particularly effective in butadiene-styrene rubbers.

---

This invention relates to a new antiozonant. The new antiozonant is N - 2 - (4-hydroxy-4-methylpentyl)-N'-phenyl-para-phenylenediamine, the formula of which is

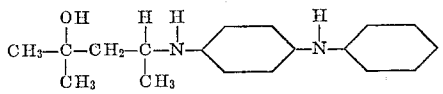

Although, generally speaking, para-phenylenediamine derivatives which have antiozonant properties are too toxic to be used in rubber production, the compound of this invention has the advantage that it is non-toxic.

The new antiozonant is effective in butadiene-styrene rubbers (whether polymerized at a lower or higher temperature and referred to herein as SBR), polybutadienes, polyisoprenes, butadiene-isoprene, etc. and is useful in stocks containing a high percentage of carbon black, and in oil-extended rubbers (e.g. SBR, polybutadiene and polyisoprene), etc.

The following illustrates the preparation of the new compound.

Preparation of N-2-(4-hydroxy-4-methylphenyl)-N'-phenyl-p-phenylenediamine

The following reactants were placed in a 250 ml. hydrogenation bottle and placed on a shaker:

| | |
|---|---|
| N-phenyl-p-phenylenediamine | 37.8 gr. (0.2 mole). |
| Diacetone alcohol (acetone free) | 26.1 gr. (0.25 mole). |
| Absolute ethanol | 200 ml. |
| Glacial acetic acid | 2.0 ml. |
| PtO₂ (Adam's catalyst) | 200 mg. |

The hydrogenator bottle containing the foregoing, was flushed several times with hydrogen and then subjected to 50 p.s.i.g. hydrogen. The shaker was started an in about 80 minutes the uptake of hydrogen had ceased. The uptake was 15.5 p.s.ig., which corresponds to 95 percent of theoretical. The reaction flask was then removed and the catalyst was separated by filtration. The solvent was then removed by distillation in vacuum and the thick oily residue was chromatographed on alkaline alumina. The material eluted with petroleum ether (B.P. 30–60°)/ether mixtures was a red colored oil. This material weighed 38.7 gr. corresponding to a yield of 68 percent theoretical. Infrared analysis shows the presence of —OH and —NH, mono- and p-disubstituted phenyl groups.

*Analysis.*—Calculated for $C_{18}H_{24}N_2O$: C, 76.02; H, 8.51; N, 9.85. Found: C, 76.25; H, 8.48; N, 9.98.

The new antiozonant was compared with the antiozonant p-phenylenediamine derivative which is the most effective of those used commercially in SBR. Although used commercially, it is toxic. Tests were made in two different butadiene-styrene co-polymer rubbers, as follows:

Rubber A.—Oil-extended rubber containing 37.5 parts of oil per 100 parts of emulsion-polymerized SBR, and also containing a small amount of whole-tire reclaim.

This rubber was compounded as a tire-sidewall stock, with carbon black, sulfur, etc. for curing at usual temperatures and times.

Rubber B.—Low-temperature (5° C.) emulsion-polymerized GR-S.

This rubber was compounded as a tire-tread stock, with carbon black, sulfur, etc. for curing at usual temperatures and times.

In the following tables, the following abbreviations are used:

Com'l=The toxic commercial antiozonant p-phenylenediamine derivative
MHPPD=N - 2-(4-hydroxy-4-methylphenyl)-N'-phenyl-p-phenylenediamine The test batches for the tire-sidewall stocks were prepared by adding different amounts of the different antiozonants to the masterbatch, the amounts being designated as parts per 100 parts of SBR (phr.) in the following table. All stocks were cured 23 minutes at 300° F. The table gives the normal physical properties and also the physical properties after aging 4 days at 212° F.

TIRE-SIDEWALL STOCKS (RUBBER A)

| Test | A | B | C | D | E | F | G | Blank |
|---|---|---|---|---|---|---|---|---|
| Antiozonant: | | | | | | | | |
| Com'l, phr | 2.0 | 2.5 | | | | | | |
| MHPPD, phr | | | 2.0 | 2.5 | 3.0 | 3.5 | | |
| MHPPD,[1] phr | | | | | | | 2.0 | |
| Ozone Evaluation [2] | Sl | Sl+ | Sl– to Mod+ | Sl– | Sl | Sl | Sl | S– |
| Normal Physical Properties: | | | | | | | | |
| 300% Modulus, p.s.i | 625 | 600 | 700 | 700 | 700 | 700 | 675 | 650 |
| Tensile Strength, p.s.i | 1,400 | 1,350 | 1,525 | 1,525 | 1,525 | 1,525 | 1,525 | 1,500 |
| Elongation, percent | 600 | 600 | 600 | 570 | 650 | 590 | 580 | 640 |
| Aged Physical Properties: | | | | | | | | |
| 300% Modulus, p.s.i | 1,325 | 1,350 | 1,250 | 1,275 | 1,175 | 1,225 | 1,250 | 1,525 |
| Tensile Strength, p.s.i | 1,450 | 1,500 | 1,400 | 1,450 | 1,450 | 1,475 | 1,425 | 1,525 |
| Elongation, percent | 320 | 330 | 340 | 330 | 370 | 360 | 340 | 300 |

[1] Reaction product as separated from solvent without further purification.
[2] Ozone Evaluation.—Test samples of the cured stocks were placed in an ozone chamber and exposed to 60 parts per million ozone at 95° F. for 14 hours. The strips were kept at 12½% elongation for 50 minutes of each hour and dynamically flexed from zero to 20% elongation for 10 minutes of each hour. The strips were then examined under 5-power magnification and the degree of cracking evaluated visually and rated on the following scale:

| | | | |
|---|---|---|---|
| None | Very slight+ | Slight | Moderate– |
| Very, very slight+ | Very slight | Slight– | Severe+ |
| Very, very slight | Very slight– | Moderate+ | Severe |
| Very, very slight– | Slight+ | Moderate | Severe– |

In the foregoing table and the one that follows, the following abbreviations are used:

Mod=Moderate
Very=Very
Sl=Slight
S=Severe

The improvement in the ozone evaluation, compared to the Blank, is very appreciable.

Samples of the tread stock were prepared and tested before and after aging 2 days at 212° F. in an air-circulating oven, with the following results:

TIRE-TREAD STOCKS (RUBBER B)

| Test | A | B |
|---|---|---|
| Antiozonant: | | |
| Com'l, phr | 2 | |
| MHPPD, phr | | 2 |
| Ozone Evaluation | None | VVSl |
| Normal Physical Properties: | | |
| 300% Modulus, p.s.i | 1,750 | 1,595 |
| 400% Modulus, p.s.i | 2,550 | 2,300 |
| Tensile Strength, p.s.i | 3,200 | 3,200 |
| Elongation, percent | 500 | 520 |
| Aged Physical Properties: | | |
| 300% Modulus, p.s,i | 2,875 | 2,600 |
| Tensile Strength, p.s.i | 2,875 | 2,975 |
| Elongation, percent | 300 | 320 |

The new antiozonant showed excellent resistance to ozone, closely comparable with said best antiozonant commercially available to the rubber compounder. The rubbers obtained with the new antiozonant had excellent properties.

Toxicity ratings were made and it was found that the new antiozonant is superior to that commercial antiozonant which is recognized as being toxic.

Toxicity test and rating

The toxicity ratings were determined by means of the "Patch Test" technique substantially as described in Occupational Diseases of the Skin, Schwartz, Tulyson and Peck, 2nd ed., Lea & Febiger, 1947, pages 54–64. The test was modified as follows: The chemicals were applied in 5 percent solutions of vaseline on ½-inch square contact material (gauze) using fifteen subjects for each test. The patches were applied and kept on for 48 hours, then taken off and the irritation produced was rated. After 7 to 10 days the patches were applied for 48 hours and again removed. Irritation reactions are those which gave a reaction with the first application. Sensitization reactions are those which do not necessarily cause irritation on first contact but effect specific changes in the skin such that, after five to seven days or more, further contact on the same or other parts of the body causes dermatitis, and if there was irritation on the first contact, a sensitization reaction was evidenced by an increase in severity of the reaction.

In reporting the reactions, they were graded as follows:

+ erythema on patch area.
++ erythema and edema at patch area.
+++ erythema, edema, papules and a few vesicles at patch area.
++++ erythema, edema, many vesicles and, in some cases, ulceration at patch area.

Weighing the various results by the number of +'s, as in the foregoing list, a toxicity rating for the different antiozonants was determined by this formula:

$$\frac{\text{Total number of +'s}}{\text{Total number of subjects}} = \text{Numerical Rating}$$

These numerical ratings were converted to comparative ratings, as follows:

0 to 0.5=non-irritating or sensitizing
0.5 to 1=slightly irritating or sensitizing
1.0 to 2.0=moderately irritating or sensitizing
2.0 to 3.0=severely irritating or sensitizing
Over 3.0=extremely irritating or sensitizing The results follow.

Toxicity tests

Com'l:
Irritation 2+++, 1++, 3+, 9 neg.; 1+++, 1++, 3+, 10 neg.
Sensitization 2+++, 2++, 11 neg.; 2+++, 3++, 5+ 5 neg.
Rating: Slightly irritating; moderately sensitizing MHPPD:
Irritation 3+, 12 neg.; 3+, 12 neg.
Sensitization 2+, 1+++, 11 neg.; 2+, 1+++, 11 neg.
Rating: Non-toxic N-2-(4-hydroxy-4-methylpentyl) - N' - phenyl - para-phenylenediamine is a preferred antiozonant.

By sulfur-vulcanization is meant the curing of rubber by reaction with either free sulfur or a vulcanizing agent of the sulfur-donor type. Known agents of the latter type include the various phenol polysulfides including the alkyl derivatives thereof, the xanthogen polysulfides, the thiuram disulfides and polysulfides, various amine sulfides including the dialkylamine polysulfides and reaction products of primary amines with excess sulfur. Known vulcanization accelerators are useful in speeding up the vulcanization process and operative herein, especially the relatively active accelerators including the thiazole sulfenamides, e.g., N - cyclohexyl - 2 - benzothiazolesulfenamide, thiazoline sulfenamides, thiocarbamyl sulfenamides, mercaptothiazoles, mercaptothiazolines, thiazolyl mono- and di-sulfides, the N,N'-di-substituted dithiocarbamates, the thiuram sulfides, the xanthogen sulfides, and metallic salts of mercaptothiazoles or mercaptothiazolines or dithiocarbamic acids.

What I claim is:
1. N-2-(4-hydroxy-4-methylpentyl)-N' - phenyl - para-phenylenediamine.
2. A sulfur-cured diene-rubber vulcanizate which contains an antiozonant amount of N-2-(4-hydroxy-4-methylpentyl)-N'-phenyl-para-phenylenediamine.
3. Sulfur-cured, butadiene-styrene copolymer rubber vulcanizate which contains an antiozonant amount of N-2-(4-hydroxy-4-methylpentyl)-N'-phenyl - para-phenylenediamine.

References Cited

UNITED STATES PATENTS

| 2,348,842 | 5/1944 | Paul | 260—45.9 |
| 2,929,796 | 5/1960 | Ambelang | 260—45.9 |
| 3,113,124 | 12/1963 | Popoff et al. | 260—45.9 |
| 3,181,942 | 5/1965 | Popoff | 260—573 |

DONALD E. CZAJA, *Primary Examiner.*

H. E. TAYLOR, JR., *Assistant Examiner.*